(12) United States Patent
Lannutti et al.

(10) Patent No.: US 9,845,860 B2
(45) Date of Patent: Dec. 19, 2017

(54) RETAINING CLAMP FOR MOLDED PLASTICS

(71) Applicants: Anthony Eugene Lannutti, Fayetteville, AR (US); James Kevin Lindstrom, Springdale, AR (US)

(72) Inventors: Anthony Eugene Lannutti, Fayetteville, AR (US); James Kevin Lindstrom, Springdale, AR (US)

(73) Assignee: Dayco IP Holdings, LLC, Troy, MI (US)

( * ) Notice: Subject to any disclaimer, the term of this patent is extended or adjusted under 35 U.S.C. 154(b) by 70 days.

(21) Appl. No.: 14/803,646

(22) Filed: Jul. 20, 2015

(65) Prior Publication Data

US 2017/0023119 A1    Jan. 26, 2017

(51) Int. Cl.
| | |
|---|---|
| *F16G 13/02* | (2006.01) |
| *F16G 15/00* | (2006.01) |
| *F16C 43/00* | (2006.01) |
| *F16H 55/48* | (2006.01) |
| *F16B 2/08* | (2006.01) |

(52) U.S. Cl.
CPC ............... *F16H 55/48* (2013.01); *F16B 2/08* (2013.01)

(58) Field of Classification Search
CPC ...... F16C 13/006; F16C 19/06; F16C 35/067; F16H 2007/0865; F16H 55/36
USPC .......................................... 474/199; 384/537
See application file for complete search history.

(56) References Cited

U.S. PATENT DOCUMENTS

| | | | | |
|---|---|---|---|---|
| 1,386,255 A | * | 8/1921 | Hindle | .................... F16C 27/04 |
| | | | | 29/898.063 |
| 1,903,776 A | * | 4/1933 | Clark | .................... F16C 35/077 |
| | | | | 29/520 |
| 2,938,757 A | * | 5/1960 | Pieper | .................... F16B 39/28 |
| | | | | 254/390 |

(Continued)

FOREIGN PATENT DOCUMENTS

| | | |
|---|---|---|
| GB | 712692 | 7/1954 |
| JP | 2010/060138 | 3/2010 |
| JP | 2011/075091 | 4/2011 |

OTHER PUBLICATIONS

PCT, International Search Report and Written Opinion, PCT/US2016/042757 (dated Sep. 30, 2016).

*Primary Examiner* — Henry Liu
(74) *Attorney, Agent, or Firm* — FisherBroyles, LLP; Susan M. Oiler (57) ABSTRACT

Retaining clamps for retaining an over-molded plastic component to a substrate are disclosed herein that include a generally annular band having an inner surface, which defines an inner cavity for receiving a substrate rotatable about a central axis, and an opposing outer surface, which receives an over molded plastic component. The clamps have a plurality of axially extending retaining features formed in the annular band. The retaining features define a trough in the inner surface and a first crest in the outer surface or define a coupling portion forming a second crest. The retaining features are evenly spaced a distance apart along the generally annular band. A pulley body assembly is disclosed having a retaining clamp seated about an outer ring of a bearing for retaining a pulley body over-molded thereto. A method for over-molding a plastic component to a substrate using the retaining clamp is also disclosed herein.

11 Claims, 8 Drawing Sheets

(56) References Cited

U.S. PATENT DOCUMENTS

| | | | |
|---|---|---|---|
| 3,061,386 A | 10/1962 | Dix et al. | |
| 3,490,285 A * | 1/1970 | Donath | F16H 7/12 474/187 |
| 3,506,317 A * | 4/1970 | De Angeli | F16C 35/067 384/542 |
| 3,679,279 A * | 7/1972 | Van Dorn | F16C 27/066 384/537 |
| 3,738,720 A * | 6/1973 | Loehle | F16C 35/077 384/537 |
| 3,758,930 A * | 9/1973 | Frost | B21D 53/10 29/511 |
| 3,767,279 A * | 10/1973 | Hallerback | F16C 33/768 384/539 |
| 3,789,683 A * | 2/1974 | Frost | F16H 55/44 474/181 |
| 3,822,605 A * | 7/1974 | Schurger | D06F 37/00 474/199 |
| 3,954,017 A * | 5/1976 | Musgrove | F16H 55/46 474/179 |
| 4,046,432 A * | 9/1977 | Hofmann | F16C 35/067 384/510 |
| 4,125,298 A * | 11/1978 | Heurich | F16C 35/063 29/520 |
| 4,366,609 A * | 1/1983 | Speer | B29C 45/1418 264/266 |
| 4,402,678 A * | 9/1983 | St. John | B23P 11/00 474/171 |
| 4,518,372 A * | 5/1985 | Dye | F16C 13/006 474/199 |
| 4,640,632 A * | 2/1987 | Brandenstein | F16C 35/067 384/537 |
| 4,688,742 A * | 8/1987 | Hettich | G11B 23/08778 188/74 |
| 4,940,936 A | 7/1990 | Grillo et al. | |
| 5,527,115 A * | 6/1996 | Zepp | F16C 27/04 384/536 |
| 5,630,769 A * | 5/1997 | Schmidt | B60B 5/02 474/167 |
| 5,660,447 A * | 8/1997 | Angelici | A63C 17/223 152/323 |
| 6,220,982 B1 * | 4/2001 | Kawashima | F16H 55/44 384/536 |
| 6,293,885 B1 * | 9/2001 | Serkh | F16C 13/006 474/133 |
| 6,505,973 B2 * | 1/2003 | Buchheim | F16C 19/54 29/898.07 |
| 6,652,150 B2 * | 11/2003 | Buchheim | F16C 19/54 29/898.07 |
| 6,715,925 B2 * | 4/2004 | Pairone | D06F 37/00 384/255 |
| 6,860,639 B2 * | 3/2005 | Tabuchi | B29C 45/1459 384/476 |
| 7,011,593 B2 * | 3/2006 | Schenk | F16C 13/006 384/477 |
| 7,223,020 B2 * | 5/2007 | Bauer | F16C 27/04 267/160 |
| 7,297,081 B2 * | 11/2007 | Eck | B29C 45/1418 474/161 |
| 7,364,522 B2 * | 4/2008 | Miyata | F16H 7/18 474/135 |
| 7,589,447 B2 * | 9/2009 | Stout | F16C 27/04 310/51 |
| 7,645,204 B2 * | 1/2010 | Swane | F16H 55/36 384/417 |
| 7,743,592 B2 * | 6/2010 | Schumacher | A01D 34/33 384/495 |
| 8,235,851 B2 * | 8/2012 | Eidloth | F16C 13/006 474/199 |
| 9,261,142 B2 * | 2/2016 | Mola | F16C 35/045 |
| 9,416,863 B2 * | 8/2016 | Schaefer | F16H 55/48 |
| 2005/0070388 A1 * | 3/2005 | Miyata | F16H 7/12 474/199 |
| 2005/0189193 A1 | 9/2005 | Ikeda | |
| 2006/0142102 A1 * | 6/2006 | Radocaj | F16H 55/36 474/199 |
| 2007/0072716 A1 * | 3/2007 | Swane | F16H 55/36 474/199 |
| 2007/0163374 A1 | 7/2007 | Yamazaki et al. | |
| 2007/0183705 A1 * | 8/2007 | Delaney | F16C 35/04 384/537 |
| 2007/0232428 A1 * | 10/2007 | Hamada | F16H 55/48 474/199 |
| 2008/0049362 A1 | 2/2008 | Hanrahan et al. | |
| 2008/0220921 A1 * | 9/2008 | Yanai | F16C 13/006 474/199 |
| 2009/0098967 A1 * | 4/2009 | Eidloth | F16C 13/006 474/199 |
| 2009/0214145 A1 * | 8/2009 | Cislo | F16C 35/04 384/208 |
| 2009/0298630 A1 * | 12/2009 | Mineno | F16C 35/063 474/199 |
| 2011/0009220 A1 * | 1/2011 | Arnault | B29C 45/1459 474/166 |
| 2012/0028745 A1 * | 2/2012 | Mola | F16C 13/006 474/166 |
| 2012/0142470 A1 * | 6/2012 | Varnnoux | F16C 13/006 474/199 |
| 2014/0346000 A1 * | 11/2014 | Chambonneau | F16D 41/067 192/45.004 |
| 2014/0357439 A1 * | 12/2014 | Schaefer | F16H 55/48 474/168 |
| 2014/0364258 A1 * | 12/2014 | Lescorail | F16H 55/36 474/150 |
| 2015/0176641 A1 * | 6/2015 | Arnault | B29C 45/1459 29/895.21 |
| 2016/0281782 A1 * | 9/2016 | Arnault | F16C 19/163 |

* cited by examiner

RETAINING CLAMP FOR MOLDED PLASTICS

TECHNICAL FIELD

The present disclosure relates to over-molded plastics, in particular to clamps for substantially preventing relative motion between an over-molded plastic component and a substrate.

BACKGROUND

Bearings are often incorporated into molded plastic pulleys, which are commonly used in drive belt applications, such as serpentine drive belt systems for driving front end accessories in/on a vehicle engine. Typically, a plastic pulley body is over-molded to the bearing. Changes in speed, load, and temperature can cause an outer race of the bearing to rotate (slip) relative to the plastic pulley shell. Seal drag from the bearing, grease viscosity, and roller contact (impacted by ball, cage and raceway design) can also impact an amount of torque back to the pulley.

Additionally, variations in temperature of the pulley system can impact slipping or rotation of the pulley relative to the outer race of the bearing. Bearings are typically constructed of metal, which has a different coefficient of thermal expansion than the plastic of the over-molded pulley. The difference in coefficients of thermal expansion between the bearing and the pulley shell can reduce the clamp load force applied by the molded pulley back to the bearing outer race. A reduction in the clamp load force reduces the frictional forces acting between the bearing and the pulley shell. As the system load increases, the plastic pulley shell tends to pull away from the bearing outer race, which leads to slippage or rotation of the pulley shell relative to the bearing outer race. Some bearings include keyways or knurl patterns to prevent slippage, but these bearings are typically very expensive. Therefore, there exists a need in the art for a cost-effective solution that may substantially prevent slippage between an over-molded plastic pulley shell and a bearing outer race.

SUMMARY

According to one aspect, a clamp for retaining an over-molded plastic component to a substrate is disclosed that includes a generally annular band having an inner surface defining an inner cavity for receiving a substrate that is rotatable about a central axis and an opposing outer surface for receiving an over molded plastic component. The generally annular band includes a plurality of retaining features formed in the generally annular band. The plurality of retaining features extend axially, and each of the plurality of retaining features defines a trough in the inner surface and a first crest in the outer surface or defines a coupling portion forming a second crest in the outer surface. The retaining clamp is rotationally balanced.

In another aspect, the generally annular band is substantially C-shaped. In another aspect, the generally annular band has a first end and a second end, and the second end engages with the first end to form the coupling portion. In another aspect, the generally annular band includes a plurality of segments interlocked together by the coupling portion.

In another aspect, the plurality of retaining features includes two or more of the retaining features that define the trough in the inner surface and the first crest in the outer surface. In another aspect, the plurality of retaining features include two or more of the coupling portions that define the second crests in the outer surface. In another aspect, the plurality of retaining features includes one of the coupling portions that defines the second crest in the outer surface and at least one of the retaining features that defines the trough in the inner surface and the first crest in the outer surface.

In another aspect, the generally annular band defines a plurality of apertures. Each of the plurality of apertures is spaced apart from each immediately adjacent one of the plurality of apertures along the generally annular band between each of the plurality of retaining features.

According to another aspect, a pulley body assembly is disclosed that includes a bearing rotatable about a central axis and having an outer ring having a radial outer surface; a retaining clamp seated against and concentric about the radial outer surface of the bearing; and a pulley body molded to the retaining clamp for rotation with the outer ring of the bearing. The retaining clamp includes a generally annular band having an inner surface defining an inner cavity having received the bearing and an opposing outer surface having received the pulley body molded thereto. The retaining clamp also includes a plurality of retaining features formed in the generally annular band. The plurality of retaining features extend axially, and each of the plurality of retaining features defines a trough in the inner surface and a first crest in the outer surface or defines a coupling portion forming a second crest in the outer surface. The pulley body assembly is rotationally balanced.

In another aspect, the retaining features of the pulley body assembly include one or more of the retaining features that define the trough in the inner surface and the first crest in the outer surface. In another aspect of the previous embodiment, each trough defined by the one or more retaining features forms an elongate channel against the outer ring of the bearing, and each trough is filled with material defining the pulley body, thereby forming part of the pulley body between the outer ring of the bearing and each of the one or more retaining features.

In another aspect of the pulley body assembly, the generally annular band extends around only a portion of the radial outer surface of the bearing. In another aspect of the pulley body assembly, the generally annular band includes two ends that extend radially outward, wherein the two ends form a supplemental retaining feature. In another aspect of the pulley body assembly, the plurality of retaining features include one or more of the coupling portion that defines the second crest in the outer surface. The coupling portion couples together a first end and a second end of the generally annular band.

In another aspect, the generally annular band includes a plurality of segments and the coupling portions couple together end portions of adjacent ones of the plurality of segments. In another aspect, the plurality of retaining features includes one of the coupling portion that defines the second crest in the outer surface and at least one of the retaining feature that defines the trough in the inner surface and the first crest in the outer surface.

In another aspect, the generally annular band defines a plurality of apertures spaced apart from each immediately adjacent one of the plurality of apertures along the generally annular band between each of the plurality of retaining features. In another aspect, the retaining clamp has a thermal expansion rate substantially similar to a thermal expansion rate of the outer ring of the bearing so that the retaining clamp does not separate from the outer ring of the bearing in response to changes in temperature.

According to another aspect, a method of making a pulley body assembly is disclosed that includes providing a bearing rotatable about a central axis and having an outer ring having a radial outer surface and providing a retaining clamp that is a generally annular band having an inner surface defining an inner cavity, an opposing outer surface, and a plurality of retaining features formed in the generally annular band. The plurality of retaining features extend axially and each of the plurality of retaining features defines a trough in the inner surface and a first crest in the outer surface or defines a coupling portion forming a second crest in the outer surface. The method further includes placing the retaining clamp against and concentrically about the radial outer surface of the outer ring of the bearing, so that each trough forms an elongate channel between the annular band and the outer ring of the bearing; securing the retaining clamp to the outer ring of the bearing; and over-molding a pulley body to the radial outer surface of the outer ring of the bearing and the retaining clamp. Each trough is filled with material defining the pulley body, thereby forming part of the pulley body between the outer ring of the bearing and the retaining clamp.

DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

A pulley generally includes a pulley body and a hub coupled to a shaft, which can be a driven shaft or a drive shaft (crankshaft). Pulley assemblies for use in engines, in particular vehicle engines, may also include decoupling mechanisms, isolators, vibration dampers, or other mechanisms, which may often be used in conjunction with one or more bearings positioned between the hub and the pulley body to promote smooth rotation of the pulley body relative to the hub. These bearings may be insert molded into a plastic pulley body to form an integrated pulley body assembly, which may then be coupled to the hub and other mechanisms to form a finished pulley.

Figure 1A:
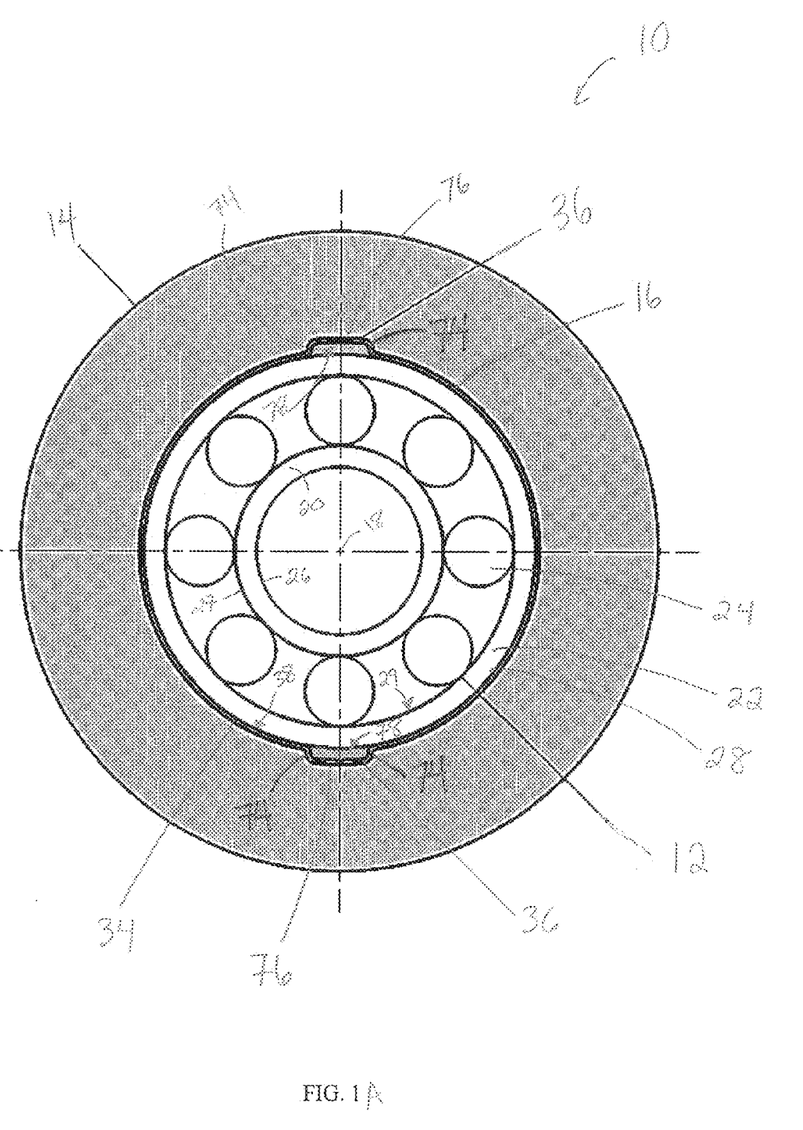
FIG. 1A is a cross-sectional top view of a pulley body assembly having a clamp as disclosed herein.
Figure 1B:
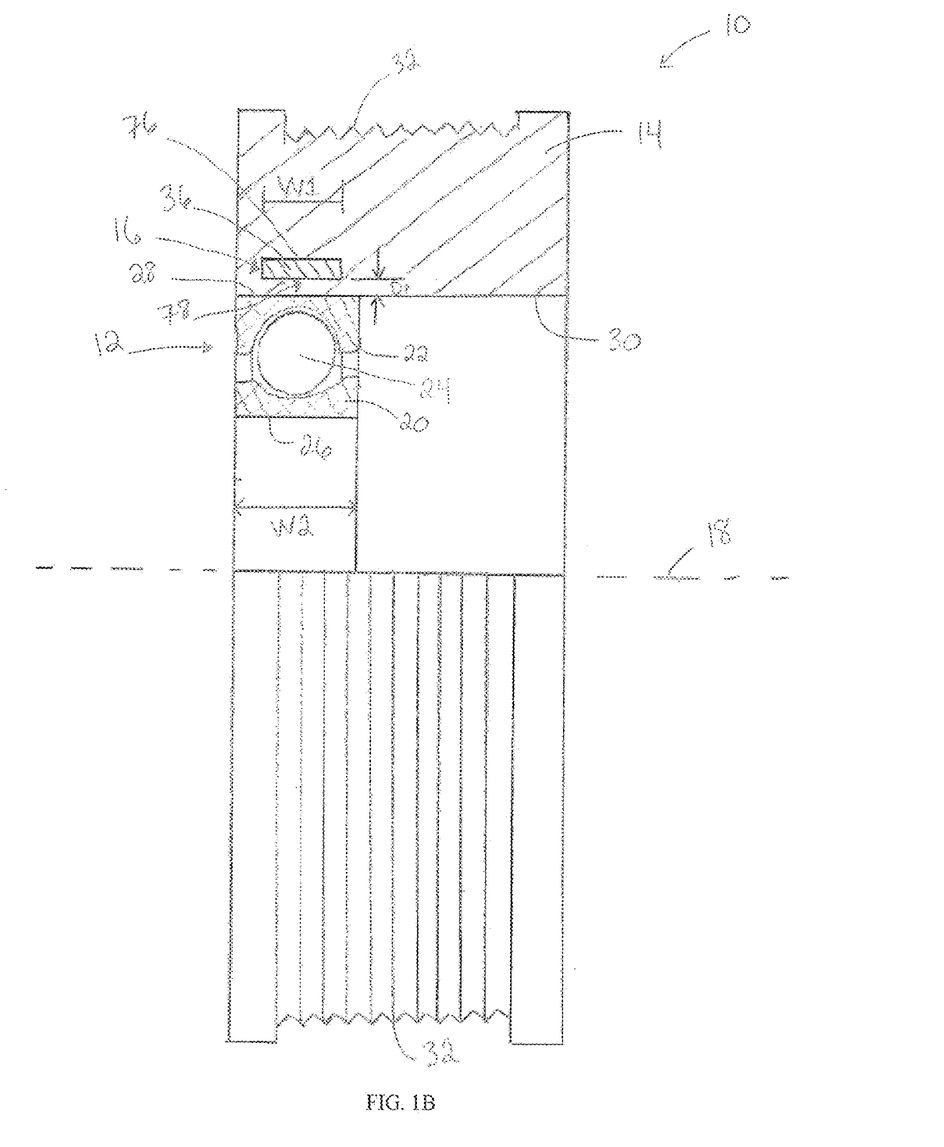
FIG. 1B is a side view, in partial cross-section, of the pulley body assembly of FIG. 1A.

Referring to FIGS. 1A-1B, a pulley body assembly 10 as disclosed herein includes a bearing 12, a pulley body 14, and a clamp 16 positioned between the pulley body 14 and the bearing 12. The bearing 12 has an inner ring 20, an outer ring 22, and a plurality of bearing members 24. The inner ring 20 (which is also referred to herein as an inner race) has an inner radial surface 26 configured to engage with a hub (not shown) of the pulley and an inner ring raceway 27 (FIG. 1A) facing radially outward and configured to receive the plurality of bearing members 24. The inner ring 20 defines an axis of rotation 18 about which the pulley body assembly 10 rotates. The outer ring 22 (which is also referred to herein as an outer race) is positioned concentric about the inner ring 20 and has an outer radial surface 28 and an outer ring raceway 29 (FIG. 1A) facing generally inward and configured to receive the plurality of bearing members 24. The bearing members 24 may be ball bearings or other types of bearings. The bearing members 24 are positioned between the inner ring 20 and the outer ring 22 and are moveable therebetween such that the outer ring 22 is capable of rotating relative to the inner ring 20. The outer ring 22 of the bearing 12 may be a metal, such as steel, aluminum, or a composite metal. The bearings may be roller bearings, ball bearings, or thrust bearings. In addition, the subject matter disclosed herein may be applied using magnetic bearings or other types of bearings with alternative or no bearing members 24.

The pulley body 14 has an inner radial surface 30 (FIG. 1B) and a belt-engaging surface 32 (FIG. 1B), and the pulley body 14 is positioned concentric about the outer ring 22 of the bearing 12 such that the inner radial surface 30 of the pulley body 14 is adjacent to and faces towards the outer radial surface 28 of the outer ring 22 of the bearing 12. The belt-engaging surface 32 is oriented radially outward and is configured to engage with a continuous loop such as a belt, chain, rope, web, or other driven/driver pulleys where plastic is over-molded onto a shaft. The belt-engaging surface 32 may be flat, contoured to receive a rounded belt, or have V-grooves for mating with the V-ribs of a V-ribbed belt or any other required contoured groove to mate with an endless belt.

The pulley body 14 is constructed of a polymeric material suitable for use in vehicle engine applications, which may include, but are not limited to, thermoplastics such as polyamides, phenolic resins, nylons, filled nylons, or polyethylenes, for example. The polymeric material may have one or more additives, such as lubricants or reinforcing materials, for example. The bearing 12 with the retaining clamp 16 secured thereto may be insert-molded into the polymeric pulley body 14 to create the pulley body assembly 10.

Still referring to FIGS. 1A-1B, the retaining clamp 16 is positioned concentrically with the outer ring 22 of the bearing 12. Specifically, the retaining clamp 16 is located between the outer ring 22 of the bearing 12 and the pulley body 14. The pulley body 14 is over-molded to the bearing 12 and retaining clamp 16, respectively. The retaining clamp 16 may be secured to the outer radial surface 28 of the outer ring 22 of the bearing 12 for rotation therewith by a securing approach such as, for example, press-fitting, thermal shrink fitting, interference fitting, hemming, crimping, welding, brazing, bonding, adhering using an adhesive, other securing approaches, or combinations thereof. The retaining clamp 16 and the outer ring 22 of the bearing 12 are secured together such that they rotate together without experiencing rotation of the retaining clamp 16 relative to the outer ring 22 of the bearing 12. In some embodiments, the retaining clamp 16 may be configured to exert spring forces against the outer ring 22 of the bearing 12 to aid in securing the retaining clamp 16 to the outer ring 22. The retaining clamp 16 may be constructed of a rigid material, which may include a metal, such as steel, aluminum, bronze, or other metal or metal alloy, or a composite material. The thermal expansion of the retaining clamp 16 and the outer ring 22 of the bearing 12 are similar such that variations in temperature do not cause the clamp 16 to separate from the outer radial surface 28 of the outer ring 22 of the bearing 12, which may cause the retaining clamp 16 to move relative to the outer ring 22 of the bearing 12. In some embodiments, the retaining clamp 16 may be constructed of the same material as the outer ring 22 of the bearing 12.

Figure 4:
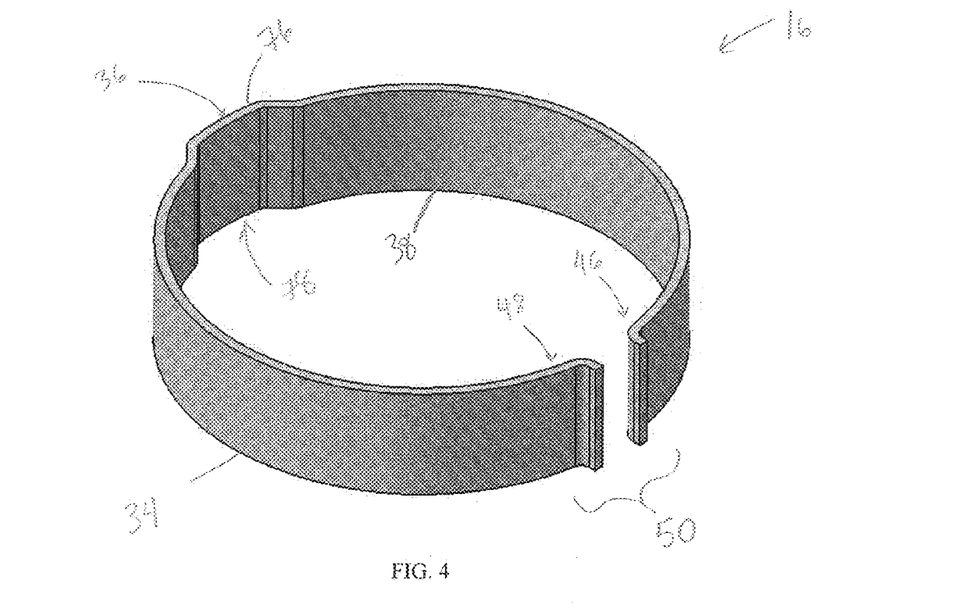
FIG. 4 is a perspective view of another embodiment of the clamp in the pulley body assembly of FIG. 1A.

Referring now to FIGS. 1A-2C, the retaining clamp 16 is a generally annular band 34 (which may also be referred to herein as body portion 34) having one or more retaining features 36 protruding radially outward therefrom. In one embodiment, the annular band 34 may go all the way around the bearing 12 to form an annular ring (as shown in FIGS. 1A and 2A). In another embodiment, the annular band 34 may be an arcuate clip or a substantially C-shaped band that extends around a portion of the outer ring 22 of the bearing 12 (as shown in FIG. 4). The annular band 34 of the retaining clamp 16 may define an interior cavity 35 (FIG. 2A) for receiving the outer ring 22 of the bearing 12. As labeled in FIG. 1B, an axial width W1 of the annular band 34 may be substantially similar to or less than an axial width W2 of the outer ring 22 of the bearing 12. The annular band 34 includes an inner radial surface 38 (FIGS. 1A and 2A) configured to engage the outer radial surface 28 (FIGS. 1A-1B) of the outer ring 22 of the bearing 12. The retaining clamp 16 is rigidly coupled to the outer ring 22 of the bearing 12. In some embodiments, the retaining clamp 16 may be rigidly connected to the outer ring 22 by crimping one or both of the annular band 34 and/or the retaining features 36 to the outer ring 22 of the bearing 12.

A coefficient of friction of the inner radial surface 38 (FIGS. 1A and 2A) of the annular band 34 may be increased by roughing the inner radial surface 38, adding a knurl pattern—such as a diamond knurl pattern—to the inner radial surface 38, or bonding a friction material having a higher coefficient of friction to the inner radial surface 38. In some embodiments, one or more apertures 72 (shown in FIG. 6) in the retaining clamp 16 may be stamped from the outside inward such that burrs from the stamping process protrude inward to increase the coefficient of friction of the inner radial surface 38 of the retaining clamp 16. Increasing the coefficient of friction of the inner radial surface 38 increases the friction between the inner radial surface 38 of the retaining clamp 16 and the outer radial surface 28 of the outer ring 22 of the bearing 12. Increasing the friction between the retaining clamp 16 and the outer ring 22 of the bearing 12 may lessen the clamping force needed to substantially prevent movement of the retaining clamp 16 relative to the outer ring 22 of the bearing 12.

The retaining features 36 extend radially outward from the annular band 34 and engage or otherwise create an interference with the inner radial surface 30 of the pulley body 14, thereby securing the pulley body 14 against rotation relative to the outer ring 22 of the bearing 12. The retaining features 36 may be formed by outwardly deforming the annular band 34 such that the retaining features 36 define a crest 76 on the outer surface 40 and a corresponding trough 78 in the inner surface 38 of the annular band 34. One or more of the retaining features 36 may define a crest 76 extending radially outward and a trough 78 formed from the space vacated by the outward deformation of the annular band 34 to create the crest 76. When assembled, the crest 76 of each retaining feature 36 provides one or more abutments 74 (FIG. 1A) or protruding surfaces that engage with the inner radial surface 30 of the pulley body 14 to substantially prevent rotation of the pulley body 14 relative to the outer ring 22 of the bearing 12. The crests 76 of the retaining features 36 may be rounded or have squared off corners. The crests 72 of the retaining features 36 act as keys engaged with keyways in the inner surface 30 of the pulley body 14.

When the retaining clamp 16 is secured to the outer ring 22 of the bearing 12, the inner radial surface 38 at each trough 78 of the retaining features 36 may be spaced apart from the outer radial surface 28 of the outer ring 22 of the bearing 12 to define a gap D (FIG. 1B) therebetween. When the clamp 16 is secured to the outer ring 22 of the bearing 12, the gap D extends axially the full width W1 (FIG. 1B) of the annular band 34 such that the trough 78 forms an elongated channel between the outer ring 22 of the bearing 12 and the annular band 34 (shown in FIG. 2A). During the over-molding process, plastic material of the pulley body 14 flows into and fills the elongated channels formed by each of the troughs 78. The embodiment in FIG. 1B shows the plastic of the pulley body 14 after plastic material has filled the elongate channel defined by the trough 78. The plastic material filling the trough 78 of the retaining feature 36 creates a portion of the pulley body 14 positioned between the annular band 34 of the retaining clamp 16 and the outer ring 22 of the bearing 12.

The retaining features 36 may also be formed by coupling one or more portions of the annular band 34 together to define one or more coupling portions 66 (shown in FIGS. 6 and 8), which protrude outward from the outer radial surface 40 of the annular band 34 to engage the inner surface 30 of the pulley body 14. The coupling portions 66 may also define a crest 76 and a trough 78 for facilitating engagement of the annular band 34 with the pulley body 14.

Figure 6:
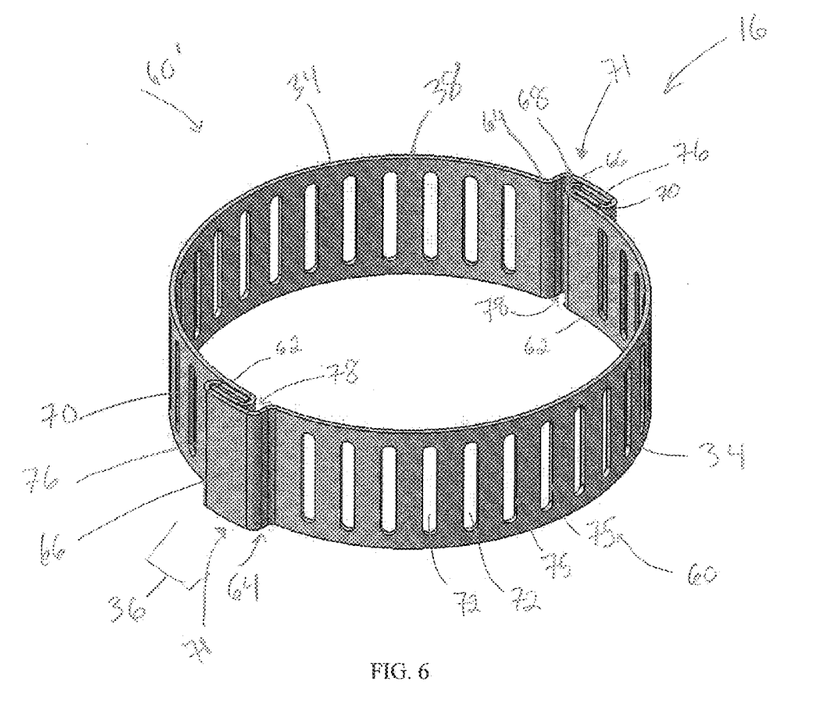
FIG. 6 is a perspective view of another embodiment of the clamp in the pulley body assembly of FIG. 1A.

In the embodiment as shown in FIGS. 1A-8, the retaining features 36 are a part of the annular band 34, however it is to be appreciated that in another embodiment (not shown) the retaining features may be separate structures that are fixedly secured to an outer radial surface 40 (FIGS. 2A-2B) of the annular band 34. The retaining features 36 may be distributed evenly (i.e., evenly spaced a distance apart) about a circumference of the clamp 16 such that the retaining clamp 16 is balanced about the axis of rotation 18. The annular band 34 may define one or more apertures (which are illustrated in FIG. 6 as reference number 72) therethrough, the apertures providing additional contact points for plastic material forming the pulley body 14 to be molded directly to the outer ring 22 of the bearing 12. The edges defining each of the plurality of apertures may provide additional abutments against movement of the pulley body 14 relative to the outer ring 22 of the bearing 12. The annular band 34 of the retaining clamp 16 may be a single piece or may include two or more segments coupled together to form an annular ring.

The retaining clamp 16 may be rotationally balanced by varying one or more of a size, shape, number, and position of each of the plurality of retaining features 36; varying one or more of a size, shape, number, and positioning of the apertures 72 (FIG. 6); or varying one or more of a shape, width, and thickness of various portions of the annular band 34.

Figure 2A:
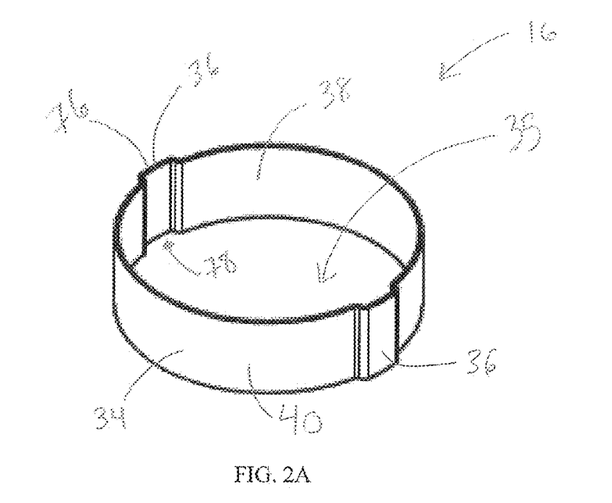
FIG. 2A is a perspective view of an embodiment of the clamp in the pulley body assembly of FIG. 1A.
Figure 2B:
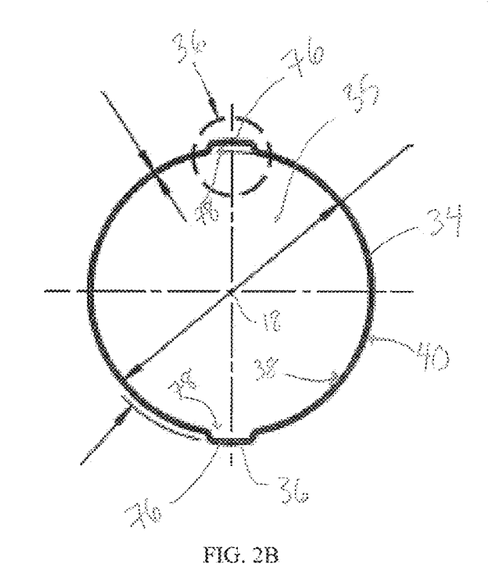
FIG. 2B is a top elevation view of the clamp of FIG. 2A.
Figure 2C:
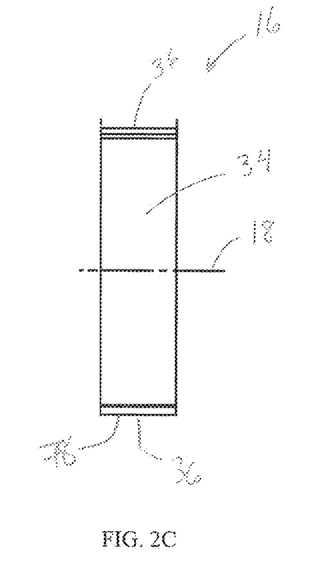
FIG. 2C is a side view of the clamp of FIG. 2A.
Figure 3A:
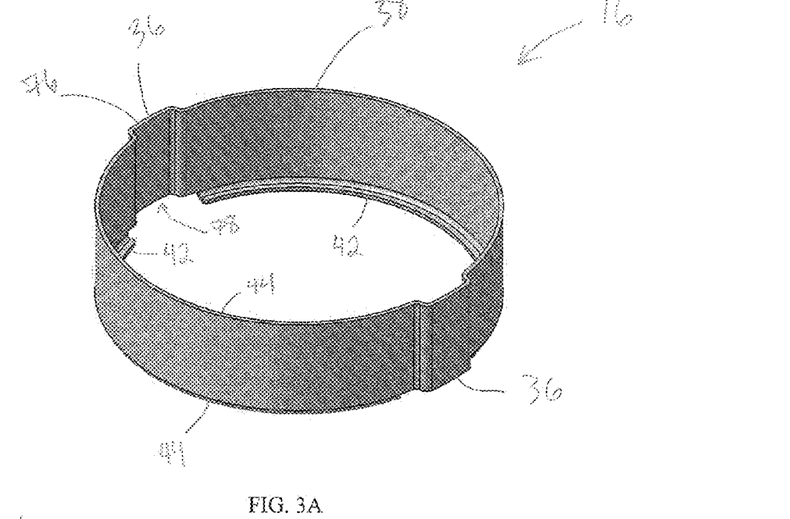
FIG. 3A is a perspective view of another embodiment of the clamp in the pulley body assembly of FIG. 1A.
Figure 3B:
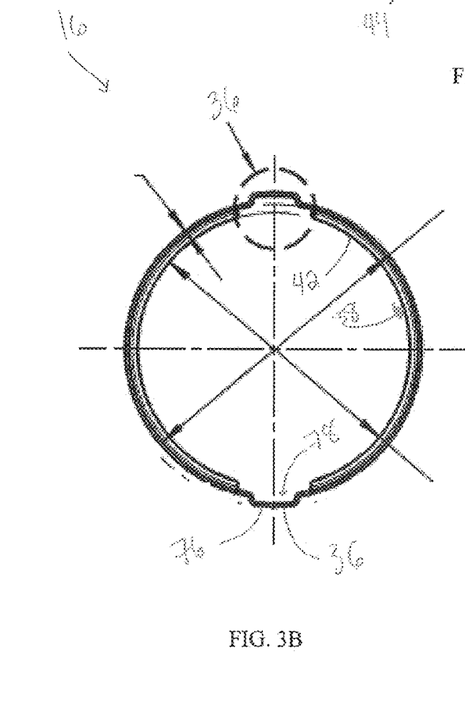
FIG. 3B is a top view of the clamp of FIG. 3A.
Figure 3C:
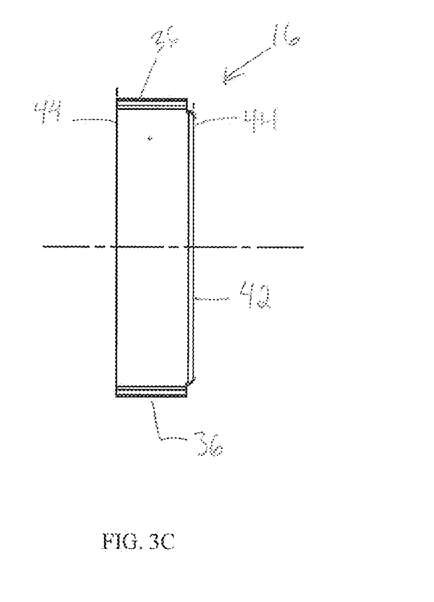
FIG. 3C is a side view of the clamp of FIG. 3A.

Referring now to FIGS. 2A-2C, the retaining clamp 16 may be an annular ring generally concentric about the axis of rotation 18 (FIGS. 2B-2C) and may have at least one or more retaining features 36 protruding outward from the annular band 34. FIG. 2B shows two retaining features 36 positioned on opposite sides of the annular band 34, however, it is understood that one or more retaining features 36 may be used in other embodiments. The annular band 34 may protrude outwardly and/or be outwardly deformed to create the retaining features 36, each of which defining the crest 76 and the trough 78. The outwardly protruding retaining features 36 may be formed by casting, sintering, welding into shape, hemming, cold forming (e.g., cold forming a thin piece of piping or stamping), other forming process, or combinations thereof. In another embodiment (not shown), the retaining features 36 may include separate retaining members coupled or secured to an outer radial surface 40 of the annular band 34 such as by welding or adhering with an adhesive, for example. Referring to FIG. 3, the retaining clamp 16 may include a lip or thin flange 42 extending inward from one axial side 44 of the annular band 34, the lip or flange 42 facilitating formation of the retaining features 36 by a stamping process.

Referring now to FIG. 4, the clamp 16 may be generally circular or arcuate in shape with the annular band 34 extending around only a portion of the outer radial surface 28 of the bearing 12 (FIGS. 1A-1B). In other words, the band 34 of the clamp 16 extends less than 360 degrees around the radial surface 28 of the bearing 12 to form an annular ring. In the embodiment shown in FIG. 4, the annular band 34 has two ends: a first end 46 and a second end 48. The retaining clamp 16 may have one or more retaining features 36 that are outward protrusions or outward deformations of the annular band 34. The first and second ends 46, 48 of the retaining clamp 16 may be flared radially outward (i.e., bent radially outward) to provide a supplemental retaining feature 50 to balance the retaining feature 36 on the opposite side of the retaining clamp 16 or retaining features 36 distributed about the circumference of the retaining clamp 16. A size and shape of the supplemental retaining feature 50 may be configured to rotationally balance the retaining clamp 16. In FIG. 4, the retaining clamp 16 may be secured to the outer ring 22 of the bearing 12 (FIGS. 1A-1B) by welding, brazing, bonding, adhering using an adhesive, or otherwise securing the clamp 16 to the outer radial surface 28 of the bearing 12 such that the retaining clamp 16 does not slip and rotate relative to the outer ring 22 of the bearing 12.

Figure 5:
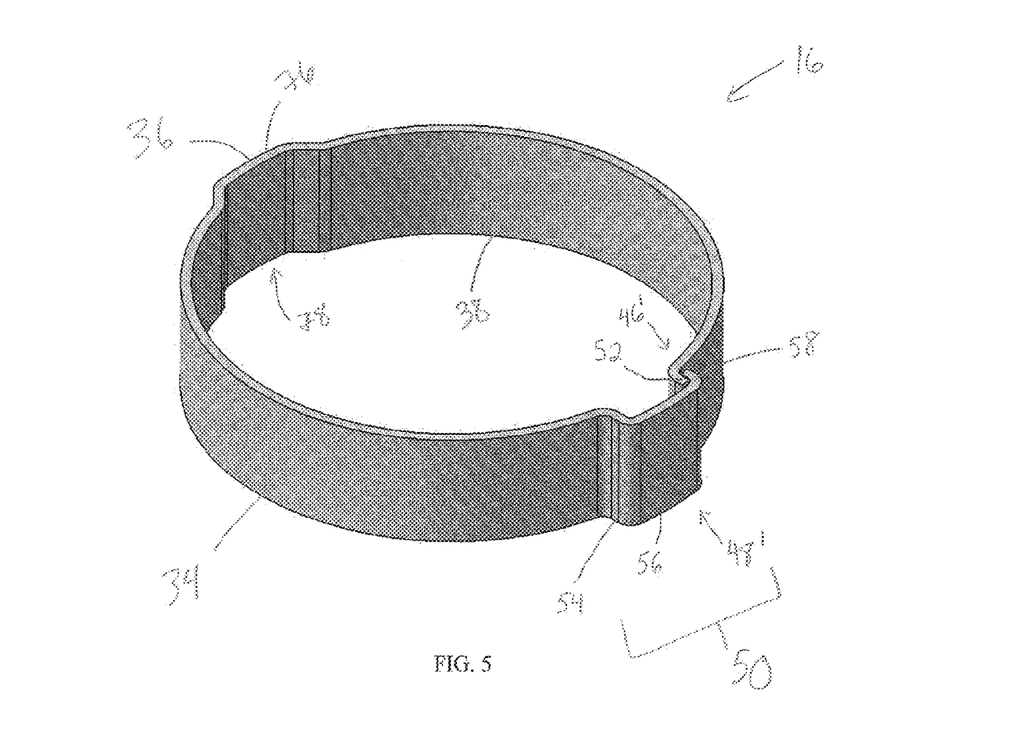
FIG. 5 is a perspective view of another embodiment of the clamp in the pulley body assembly of FIG. 1A.

Referring now to FIG. 5, the retaining clamp 16 may have an annular band 34 with a first end 46' and a second end 48' that are engageable with one another to form the annular shape of the retaining clamp 16. The first end 46' may have a flared portion 52 that bends and extends radially outward, and the second end 48' may be configured to engage with the first end 46'. In some embodiments, the second end 48' may have an outward extending portion 54, a retaining feature portion 56, and an engaging portion 58. The second end 48' may bend and extend outward from the annular band 34 to form the outward extending portion 54 and then bend again along a circular path positioned outward from the annular band 34 to form the retaining feature portion 56, which is similar in shape to the retaining feature 36 positioned on the opposite side of the retaining clamp 16. The second end 48' may then bend inward to form the engaging portion 58, which is configured to overlap with and engage the flared portion 52 of the first end 46' to form the annular ring. In some embodiments, the second end 48' is configured to interconnect with the first end 46' by a snap fit. In some embodiments, the second end 48' and the first end 46' are hemmed together to form a grooved flat lock seam (not shown in FIG. 5). The retaining feature portion 56 of the second end 48' forms a supplemental retaining feature 50 to balance the retaining feature 36 on the opposite side of the retaining clamp 16 or the retaining features 36 evenly spaced about the circumference of the clamp 16. The retaining clamp 16 may be secured to the outer ring 22 of the bearing 12 (FIGS. 1A-1B) by welding, brazing, bonding, hemming, adhering using an adhesive, or otherwise securing the retaining clamp 16 to the outer radial surface 28 of the bearing 12.

Referring now to FIG. 6, the retaining clamp 16 may include two or more segments 60, 60' that engage with one another in order to create the annular shape of the retaining clamp 16. Although only two segments 60, 60' are illustrated in FIG. 6, it is to be appreciated that the retaining clamp 16 may include more than two segments 60 that are interlocked with one another. The first and second ends 62, 64 of each segment 60 may be mateable with complimentary second and first ends 64, 62 of one or more adjacent segments 60', such as by hemming, to couple the segments 60, 60' together to form the annular band 34. Mating the ends of adjacent segments 60, 60' defines one or more coupling portions 66 of the annular band 34. The coupling portions 66 may protrude outward from the segments 60 to provide for the retaining features 36 that engage with the inner radial surface 30 of the pulley body 14 to substantially prevent motion of the pulley body 14 (FIGS. 1A-1B) relative to the retaining clamp 16 and outer ring 22 of the bearing 12. In one embodiment, the coupling portions 66 may be created by hemming the first end 62 of the segment with the second end 64 of an adjacent segment 60'. In another embodiment, the coupling portions 66 may include a first interlocking channel 68 and a second interlocking channel 70. The first interlocking channel 68 may be formed by bending the first end 62 of the segment 60 outward and back upon itself. The second interlocking channel 70 may be formed by deforming the second end 64 of the segment 60 outward and then bending a portion of the second end 64 inward and back upon itself. Thus, the first interlocking channel 68 of one segment 60 interlocks with the second interlocking channel 70 of an adjacent segment 60'. The coupling portions 66 of the segments 60 may be crimped, hemmed, welded, brazed, bonded, adhered using an adhesive, or otherwise secured together to form the annular ring. In one embodiment, the segments 60 are hemmed together using a grooved flat lock seam 71 to form the retaining clamp 16. Additionally, the retaining clamp 16 may be press-fit, thermal shrink fit, interference fit, crimped, hemmed, welded, brazed, bonded, adhered using an adhesive, or otherwise secured to the outer ring 22 of the bearing 12. In one embodiment, the coupling portions 66 may define a crest 76 on the outer surface 40 of the annular band 34 and a trough 78 between the inner radial surface 38 of the annular band 34 and the radial outer surface 28 of the outer ring 22 of the bearing 12. When the pulley body 14 is over-molded to the clamp 16 and bearing 12, plastic material from the pulley body 14 may flow into and fill the trough 78 of the coupling portion 66.

FIG. 6 shows the retaining clamp 16 having a plurality of apertures 72 extending through the annular band 34. When installed on the outer ring 22 of the bearing 12 (FIGS. 1A-1B), the apertures 72 provide shallow cavities into which the plastic material of the pulley body 14 flows and fills during the molding process. This filling of the plastic material into the cavities formed by the apertures 72 creates additional longitudinal surfaces 75 or abutments that resist motion of the pulley body 14 (FIGS. 1A-1B) relative to the outer ring 22 of the bearing 12. The plurality of apertures 72 may have any convenient shape that provides a longitudinal abutment or surface 75 that acts as a shoulder that may abut against the pulley body 14 (FIG. 1A-1B), thereby substantially preventing motion of the pulley body 14 relative to the outer ring 22 of the bearing 12. The size, shape, and location of one or more of the apertures 72 may be varied to aid in balancing the retaining clamp 16 and the pulley body assembly 10. In some embodiments, the apertures 72 may be stamped through the retaining clamp 16 from the outside radially inward such that the burrs from the stamping process increase the coefficient of friction of the inner radial surface 38 of the retaining clamp 16.

Figure 7:
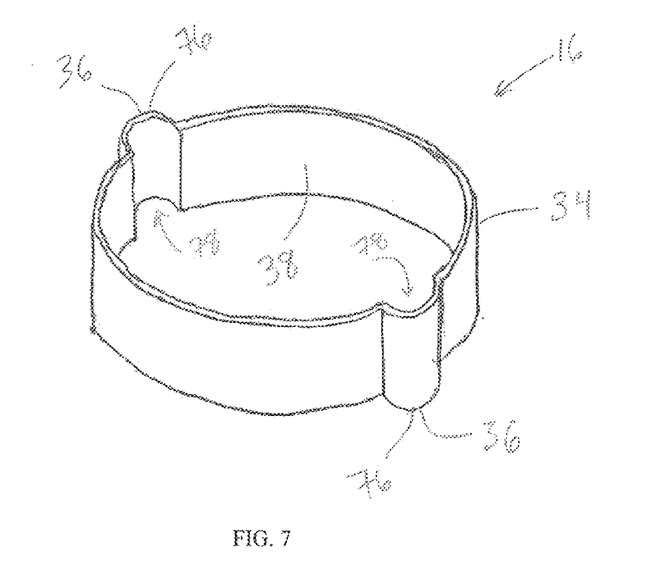
FIG. 7 is a perspective view of another embodiment of the clamp in the pulley body assembly of FIG. 1A.

Referring now to FIG. 7, the retaining clamp 16 may be an annular ring having retaining features 36 that may be generally C-shaped when viewed from a top plan view. The C-shape of the retaining features 36 enables the retaining clamp 16 to be flexible such that it can open wide enough for the retaining clamp 16 to fit over the outer ring 22 of the bearing 12 (FIG. 1A-1B). Upon widening the retaining clamp 16, the C-shaped retaining features 36 function as C-springs to generate a spring force that aids in securing the retaining clamp 16 against the outer ring 22 of the bearing 12.

Figure 8:
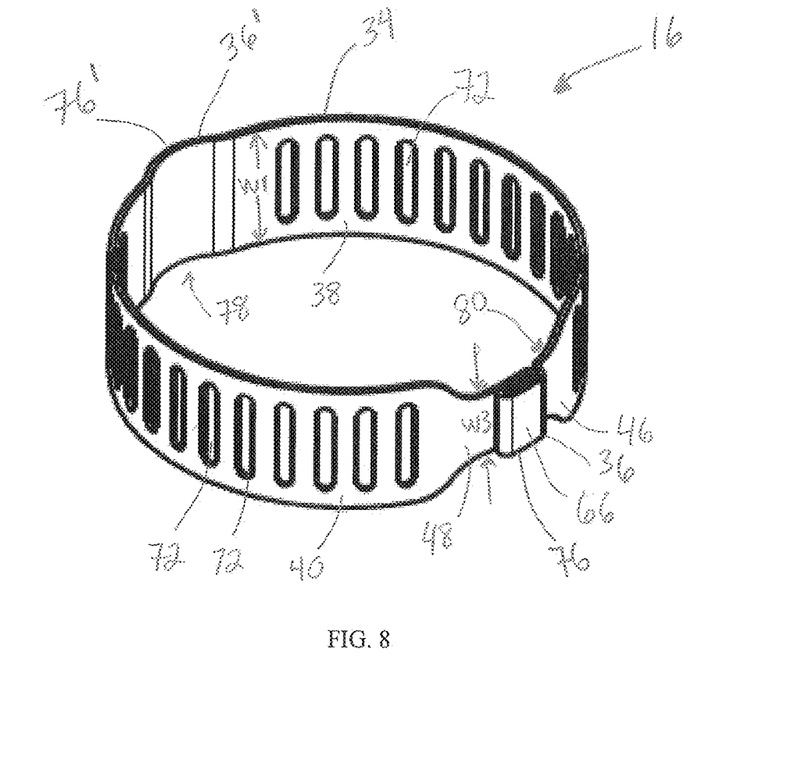
FIG. 8 is a perspective view of another embodiment of the clamp in the pulley body assembly of FIG. 1A.

Referring now to FIG. 8, the retaining clamp 16 can have a retaining feature 36 that is a coupling portion 66 that couples together the first end 46 and the second end 48 of the annular band 34. The coupling portion 66 defines a crest 76 in the outer surface 40 of the annular band 34. The retaining clamp 16 may additionally have a retaining feature, designated 36', that defines crest 76' in the outer surface 40 and trough 78 in the inner surface 40. Retaining feature 36' may be generally C-shaped when viewed from a top plan view. The C-shape of the retaining feature 36' enables the retaining clamp 16 to be flexible so that it can open wide for the retaining clamp 16 to fit over the outer ring 22 of the bearing 12 (FIG. 1A-1B). Upon widening the retaining clamp 16, the C-shaped retaining features 36' may function as a C-spring to generate a spring force that aids in securing the retaining clamp 16 against the outer ring 22 of the bearing 12. As shown in FIG. 8, the annular band 34 may have a plurality of apertures 72 that are spaced a distance apart from each other along the annular band 34 between the retaining features 36, 36'. The apertures 72 may be longitudinal with respect to the axis of rotation 18 (FIG. 1A-1B). The annular band 34 may include a narrow portion 80 having a narrower width W3 compared to the width W1 of the annular band 34. The size, shape, number, and/or position of the apertures 72 and the shape of the narrow portion 80 of the annular band 34 may be configured to rotationally balance the retaining clamp 16.

Referring back to FIGS. 1A-1B, the pulley body assembly 10 described herein is made by providing or utilizing the bearing 12 having the inner ring 20 (inner race), the outer ring 22 (outer race), and the plurality of bearing members 24. The outer ring 22 has an outer radial surface 28. The retaining clamp 16 is positioned around and concentric with the outer ring 22 of the bearing 12 and secured or coupled into place against the outer radial surface 28 of the bearing 12 by press-fitting, thermal shrink fitting, interference fitting, crimping, hemming, welding, brazing, bonding, adhering using an adhesive, other securing means, or combinations thereof. The pulley body 14 is then over-molded to the outer radial surfaces 28, 40 of the bearing 12 and retaining clamp 16, respectively, such that the retaining features 36 of the clamp 16 extend radially outward and into the pulley body 14. In some embodiments, the plastic of the pulley body 14 flows radially inward to fill any apertures defined by the annular band 34 of the retaining clamp 16 and/or any elongated channels formed by each trough 78 defined between the retaining features 36 of the retaining clamp 16 and the outer ring 22 of the bearing 12. The retaining features 36 and/or apertures create irregularities in the outer radial surface 40 of the annular band 34 of the clamp 16. Through the over-molding process, the inner radial surface 30 of the pulley body 14 conforms to the outer radial surface 40 of the retaining clamp 16 and the irregularities thereon created by the retaining features 36 and/or apertures 72. These surface irregularities become part of the boundary between the retaining clamp 16 and the pulley body 14. The irregularities may include various longitudinal abutments 74 or longitudinal shoulders engaged with the plastic of the pulley body 14 to substantially prevent the pulley body 14 from moving relative to the outer ring 22 of the bearing 12. The over-molding process may further include placing the bearing 12, with the retaining clamp 16 secured thereabout, into a mold, closing the mold, injecting the polymeric material into the mold, curing the polymeric material, releasing the mold, ejecting or removing the finished pulley body assembly 10, and retaining the pulley body assembly 10 for incorporation into a pulley. In some embodiments, the over-molding process further includes injecting the polymeric material in the mold at a pressure high enough for the polymeric material to deform the retaining features 36 of the retaining clamps 16.

The retaining clamp is not limited to the embodiments disclosed herein in relation to pulley body assemblies. Generally, the retaining clamp (e.g., retaining clamp 16) may be useful for securing other over-molded plastic components (e.g., pulley body 14) against rotation relative to a substrate upon which the retaining clamp is molded. The substrate may be, for example, the outer ring 22 of the bearing 12. As with the pulley body assembly, the retaining clamp may be substantially round and may define an internal cavity for receiving the substrate. The retaining clamp may be positioned around an outer surface of the substrate and secured thereto by any of the disclosed securing means. The retaining clamp/substrate assembly may be inserted into a mold and the plastic component over-molded to the outer surface thereof. The retaining features of the retaining clamp protrude outward to form irregularities in the interface between the clamp and the molded plastic component, and these irregularities act to substantially prevent the molded plastic components from having relative motion to the substrate.

Figure 9:
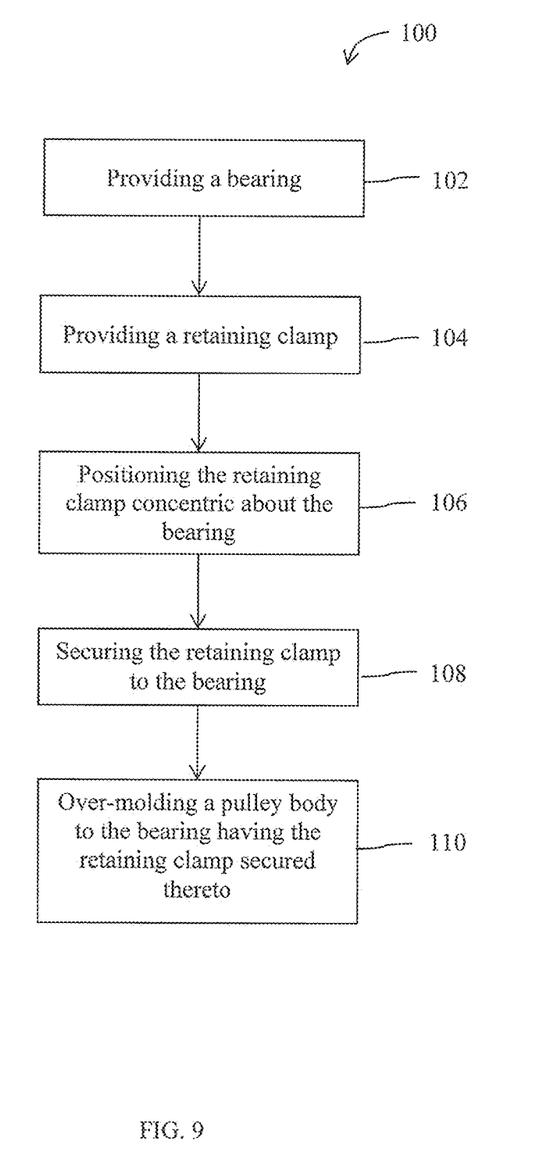
FIG. 9 is a flow diagram illustrating a method for making the pulley body assembly of FIG. 1A.

Referring to FIG. 9, a method 100 of manufacturing a pulley body assembly 10 as disclosed herein includes: providing 102 a bearing 12 rotatable about a central axis 18 and having an outer ring 22 having a radial outer surface 28; providing 104 a retaining clamp 16 that is a generally annular band 34 having an inner surface 38, an opposing outer surface 40, and a plurality of retaining features 36 formed in the annular band 34, the retaining features 36 extend axially and one or more of the retaining features 36 defines a trough in the inner surface and a crest in the outer surface; positioning 106 or seating the retaining clamp 16 concentrically about the outer ring 22 of the bearing 12 such that each trough forms an elongate channel against the outer ring 22 of the bearing 12; securing 108 the retaining clamp 36 the outer ring 22 of the bearing 12; and over-molding 110 a pulley body 14 circumferentially to the radial outer surface 28 of the bearing 12 and the retaining clamp 26 secured thereto for rotation with the outer ring 22 of the bearing 12. Each trough 78 is filled with material defining the pulley body 14, thereby forming part of the pulley body 14 between the outer ring 22 of the bearing 12 and one or more of the retaining features 36.

The pulley body assembly disclosed herein may be used for various vehicle engine applications by at least securing a hub within the inner ring of the bearing and securing a shaft within an inner bore of the hub. Other features and parts of the pulley may also be assembled into the finished pulley assembly. In some embodiments, the shaft may be a crankshaft that imparts force to a drive pulley having a pulley body assembly as disclosed herein. In some embodiments, the shaft may be a driven shaft such that power is supplied to the pulley by the continuous belt, which is engaged with the belt-engaging surface of the pulley body. Power received from the belt is transferred to the shaft, which is a driven shaft that is used to, in turn, power other ancillary systems (e.g., coolant pump, air-conditioner compressor, alternator, etc.). The pulley body assembly could also be used in pulleys that are neither drive nor driven pulleys, such as belt-tensioning pulleys or idler pulleys, for example.

The retaining clamp and pulley body assembly disclosed herein provide a relatively simple and inexpensive way to substantially prevent slippage of a plastic pulley body over-molded to a metal outer ring of a bearing. Using a retaining clamp to prevent slippage eliminates the need for interlocking features, such as knurls, notches, indentations or protrusions, to be specially designed into the outer radial surface of the outer race of the bearing. This, in turn makes it easier and less expensive to switch bearing suppliers in response to pressures to reduce costs. In addition, the degree to which the retaining features protrude outward and the clamp load pressure may be modified to increase the torque capacity of the retaining clamp. The similarity in materials between the retaining clamp and the outer race of the bearing makes the thermal expansion rate similar between the clamp and the outer race, which keeps the force applied to the bearing at a more consistent rate through its varying temperature cycles. The retaining clamps may also be used in existing insert-molding equipment without the need for expensive retooling or modifications.

Although the invention is shown and described with respect to certain embodiments, it is obvious that modifications will occur to those skilled in the art upon reading and understanding the specification, and the present invention includes all such modifications.

What is claimed is:

1. A clamp for retaining an over-molded plastic component to a substrate, the clamp comprising:
    a generally annular band having an inner surface defining an inner cavity for receiving a substrate that is rotatable about a central axis, an opposing outer surface for receiving an over-molded plastic component, and a first end and a second end, the second end engagable with the first end to form a coupling portion; and
    a plurality of retaining features formed in the generally annular band;
    wherein the plurality of retaining features extend axially, and each of the plurality of retaining features defines a trough in the inner surface and a crest in the outer surface;
    wherein at least one of the plurality of retaining features is defined by the coupling portion; and
    wherein the retaining clamp is rotationally balanced.

2. The clamp of claim 1, wherein the generally annular band is substantially C-shaped in an open position.

3. The clamp of claim 1, wherein the generally annular band comprises a plurality of segments interlocked together by a plurality of coupling portions.

4. The clamp of claim 1, wherein the plurality of retaining features comprises two or more of the retaining features.

5. The clamp of claim 1, wherein the plurality of retaining features comprises two or more of the coupling portions.

6. A clamp for retaining an over-molded plastic component to a substrate, the clamp comprising:
    a generally annular band having an inner surface defining an inner cavity for receiving a substrate that is rotatable about a central axis and an opposing outer surface for receiving an over molded plastic component; and
    a plurality of retaining features formed in the generally annular band;
    wherein the plurality of retaining features extend axially, and each of the plurality of retaining features defines a trough in the inner surface and a first crest in the outer surface or defines a coupling portion forming a second crest in the outer surface;
    wherein the retaining clamp is rotationally balanced; and
    wherein the generally annular band defines a plurality of apertures, each of the plurality of apertures spaced apart from each immediately adjacent one of the plurality of apertures along the generally annular band between each of the plurality of retaining features.

7. A pulley body assembly comprising:
    a bearing rotatable about a central axis and having an outer ring having a radial outer surface;
    a retaining clamp seated against and concentric about the radial outer surface of the bearing; and
    a pulley body molded to the retaining clamp for rotation with the outer ring of the bearing;
    wherein the retaining clamp comprises:
        a generally annular band having an inner surface defining an inner cavity having received the bearing, an opposing outer surface having received the pulley body molded thereto, and a first end and a second end, the second end engagable with the first end to form a coupling portion; and
        a plurality of retaining features formed in the generally annular band;
        wherein the plurality of retaining features extend axially, and each of the plurality of retaining features defines a trough in the inner surface and a crest in the outer surface;
        wherein at least one of the plurality of retaining features is defined by the coupling portion; and
        wherein the pulley body assembly is rotationally balanced.

8. The pulley body assembly of claim 7, wherein each trough defined by the one or more retaining features forms an elongate channel against the outer ring of the bearing, and each trough is filled with material defining the pulley body, thereby forming part of the pulley body between the outer ring of the bearing and each of the one or more retaining features.

9. The pulley body assembly of claim 7, wherein the generally annular band comprises a plurality of segments and the coupling portions couple together end portions of adjacent ones of the plurality of segments.

10. A pulley body assembly comprising:
   a bearing rotatable about a central axis and having an outer ring having a radial outer surface;
   a retaining clamp seated against and concentric about the radial outer surface of the bearing; and
   a pulley body molded to the retaining clamp for rotation with the outer ring of the bearing;
   wherein the retaining clamp comprises:
      a generally annular band having an inner surface defining an inner cavity having received the bearing and an opposing outer surface having received the pulley body molded thereto; and
      a plurality of retaining features formed in the generally annular band;
   wherein the plurality of retaining features extend axially, and each of the plurality of retaining features defines a trough in the inner surface and a first crest in the outer surface or defines a coupling portion forming a second crest in the outer surface;
   wherein the pulley body assembly is rotationally balanced; and
   wherein the generally annular band defines a plurality of apertures spaced apart from each immediately adjacent one of the plurality of apertures along the generally annular band between each of the plurality of retaining features.

11. The pulley body assembly of claim 7, wherein the retaining clamp has a thermal expansion rate substantially similar to a thermal expansion rate of the outer ring of the bearing so that the retaining clamp does not separate from the outer ring of the bearing in response to changes in temperature.

* * * * *